United States Patent [19]

Nishio et al.

[11] Patent Number: 4,971,740
[45] Date of Patent: * Nov. 20, 1990

[54] METHOD FOR MANUFACTURING A SINTERED BODY OF SILICON NITRIDE

[75] Inventors: Hiroaki Nishio; Takeshi Kawashima, both of Tokyo, Japan

[73] Assignee: Nippon Kokan Kabushiki Kaisha, Tokyo, Japan

[*] Notice: The portion of the term of this patent subsequent to Jun. 5, 2007 has been disclaimed.

[21] Appl. No.: 188,372

[22] Filed: Apr. 29, 1988

[30] Foreign Application Priority Data

Jun. 12, 1987 [JP] Japan ................................. 62-145324

[51] Int. Cl.$^5$ .............................................. C04B 35/64
[52] U.S. Cl. ......................................... 264/62; 264/63; 264/344; 419/13; 419/40
[58] Field of Search ........................... 264/62, 63, 344; 419/13, 40

[56] References Cited

U.S. PATENT DOCUMENTS

| | | |
|---|---|---|
| 4,112,143 | 9/1978 | Adlerborn et al. |
| 4,622,186 | 11/1986 | Mizutani .................... 264/62 |
| 4,643,858 | 2/1987 | Mizutani .................... 264/62 |
| 4,737,332 | 4/1988 | Miyashita et al. ............ 264/344 |
| 4,820,462 | 4/1989 | Nakajima et al. ............ 264/63 |
| 4,843,043 | 3/1988 | Nishio . |

FOREIGN PATENT DOCUMENTS 3403917 11/1985 Fed. Rep. of Germany .
59-35870 8/1984 Japan .

*Primary Examiner*—James Derrington
*Attorney, Agent, or Firm*—Frishauf, Holtz, Goodman & Woodward

[57] ABSTRACT

A method for manufacturing a sintered body is provided, comprising the steps of dispersing powdery silicon nitride and a sintering assistant into a first dispersion medium composed mainly of substance capable of being extracted by supercritical fluid to form a first slurry and casting the first slurry to form a compact; dispersing powdery material into a second medium composed mainly of substance capable of being extracted by the supercritical fluid to form a second slurry and coating the second slurry on the surface of the compact to form a film layer; dipping the compact covered with the film layer in the supercritical fluid to extract the first dispersion medium and the second dispersion medium, respectively from the compact and the film layer; heating the compact from which the first and second dispersion mediums have been removed to form the film layer into a film layer impermeable to gas; and sintering the compact covered with the film layer impermeable.

24 Claims, 1 Drawing Sheet

METHOD FOR MANUFACTURING A SINTERED BODY OF SILICON NITRIDE

BACKGROUND OF THE INVENTION

1. Field of the Invention

The present invention relates to a method for manufacturing a sintered body of silicon nitride by sintering a compact of silicon nitride.

2. Description of the Prior arts

Silicon nitride is widely known as material for sintering, but silicon nitride alone is hard to sinter. Powders of $Y_2O_3$, $Al_2O_3$, MgO, $La_2O_3$, AlN, $BeSiN_2$ and $BeAl_2O_4$ are added, as a sintering assistant, to silicon nitride powders to prepare powder material. From this powder material a compact of a complicated shape is comparatively easy to be formed by a method of slip casting.

In the method of slip casting, the powder material is dispersed into a liquefied dispersion medium to be formed into slurry and this slurry is cast into a mold having a desired cavity shape. Depending on methods of solidifying slurry cast, the method for slip casting is classified into the following two methods:

(a) a mold having a feature by absorbing liquid which is made of gypsum, porous resin or the like is used. This mold absorbs a part of water content in the slurry to form a feature of maintaining the shape of a compact once molded. And then, the mold is demolded to obtain a compact of a desired shape. In this method, water and alcohol are used as a dispersion medium to disperse the powder material.

(b) The slurry material is cast in a mold which is cooled down upto the melting point temperature of a dispersion medium or less, or the mold is cooled upto the same temperature after the powder material is cast therein to solidify the dispersion medium, thereby maintaining the shape of a molded compact. And then, the mold is demolded to obtain a compact of the desired shape. In this method, paraffin is used as the dispersion medium.

The compact thus prepared is sent to the process wherein the dispersion medium is removed. This removal of the dispersion medium is carried out through air drying or vaporization by heating when the dispersion medium is water and alcohol, and through the vaporization and thermal decomposition of paraffin by means of heating it at 500° C. when it is used as the dispersion of medium.

The compact from which the dispersion medium has been removed is transferred to the process of sintering, and the compact is buried into powdery fillers filled in a crucible in advance of the sintering.

This is because of reducing decomposition of silicon nitride and avoiding direct contact of the compact with the graphite crucible which impairs sintering. The powdery fillers are those which $Si_3N_4$, $SiO_2$, $Al_2O_3$, AlN, MgO and BN are appropriately mixed into. Sintering operation is applied to the compact covered with the powdery fillers The operation is carried out at 1,600° to 2,000° C. and in the atmosphere of nitrogen having the pressure or more at which silicon nitride is decomposed so as to prevent the thermal decomposition thereof The pressure of the nitrogen atmosphere is required to be raised in proportion to the rise of the temperature, but within the aforementioned range of the temperature, 0 to $10 kg/cm^2 \cdot G$ is ordinarily adopted. In addition, it is known that the dispersion medium remaining in the compact after the removal is perfectly removed by degassing, for example, at $10^{-2}$ Torr and 1,000° C.

On the other hand, there is a method wherein a density of silicon nitride compact is increased by hot isostatic pressing process Namely, the process is applied to the compact at 1,600° to 1,900° C. and in the atmosphere of the gas such as $N_2$ and Ar having 1,000 to 1,300 $kg/cm^2 \cdot G$. In this method, a film layer impermeable to gas is formed on the surface of the compact and heat and pressure is applied thereto from the outside of the film layer. Those methods are disclosed, for example, in a Japanese Examined Patent Publication No. 35870/84 and a West German Patent No. 3,403,917.

Said Japanese Examined Patent Publication mentions a method wherein:

(a) a pre-compact is dipped in slurry of powder material for forming a film layer thereof;

(b) the film layer formed by said dipping is dried;

(c) the step of said dipping and drying is repeatedly carried out, and through this repetition, an inner porous film layer comprising a high melting glass forming substance or a high melting metal forming substance, and an outer porous film layer comprising a low melting glass forming substance or a low melting metal forming substance are formed; and (d) the outer porous film layer is made to be impermeable by means of heating, and subsequently the inner porous film layer to be impermeable.

Said West German Patent discloses another method repeating the step of said dipping and drying to form porous film layers as shown in said Japanese Examined Patent Publication. But in this method, as an inner porous film layer, a substance having no sintering assistant, and as an outer porous film layer, a substance having a sintering assistant, respectively are used. By means of heating, sintering of the outer film layer is promoted thereby to change it into a fine impermeable one.

In case of silicon nitride, pressure and temperature to which hot isostatic pressing treatment contributes is at least 100 $kg/cm^2 \cdot G$ and 1,600° C., although it depends on a feature of a sintering assistant. The above-mentioned method using a film layer impermeable to gas, as a pressure medium, is applicable at the critical pressure or more and the critical temperature or more.

Those prior art methods of sintering silicon nitride have the following disadvantages:

(a) when sintering silicon nitride is carried out without powdery fillers, decomposition of silicon nitride is unavoidable;

(b) even if the sintering is done with powdery fillers wherein the pre-compact is buried, the perfect exclusion of decomposition of silicon nitride cannot be attained, and a layer of deterioration in quality is formed on the surface of the compact; and (c) because the heat conduction of the powder fillers is very bad, it takes a long time for the sintering when they are used.

In addition, the prior art process of forming an impermeable film layer comprises many steps such as removing a dispersion medium from a compact, coating slurry of a porous film layer forming substance, and drying, and the pre-process for sintering, thus, becomes intricate.

SUMMARY OF THE INVENTION

It is an object of the present invention to provide a method for manufacturing a quality sintered body silicon nitride through a comparatively simple process To attain the object, in accordance with the present invention, a method is provided for manufacturing a sintered body of silicon nitride comprising the steps of dispersing powdery silicon nitride and a sintering assistant into a first dispersion medium composed mainly of substance capable of being extracted by supercritical fluid to form a first slurry and casting the first slurry to form a compact; dispersing a powdery material into a second dispersion medium composed mainly of substance capable of being extracted by the supercritical fluid to form a second slurry and coating the second slurry on the surface of the compact to form a film layer; dipping the compact covered with the film layer in the supercritical fluid to extract and remove the first dispersion medium included in the compact and the second dispersion medium included in the film layer; heating the compact from which the first medium and second dispersion mediums have been removed to change the film layer into a film layer impermeable to gas; and sintering the compact covered with the film layer impermeable.

The object and other objects and advantages will become apparent from the detailed description to follow, taken in conjunction with the appended drawing

DESCRIPTION OF THE PREFERRED EMBODIMENT

Figure 1:
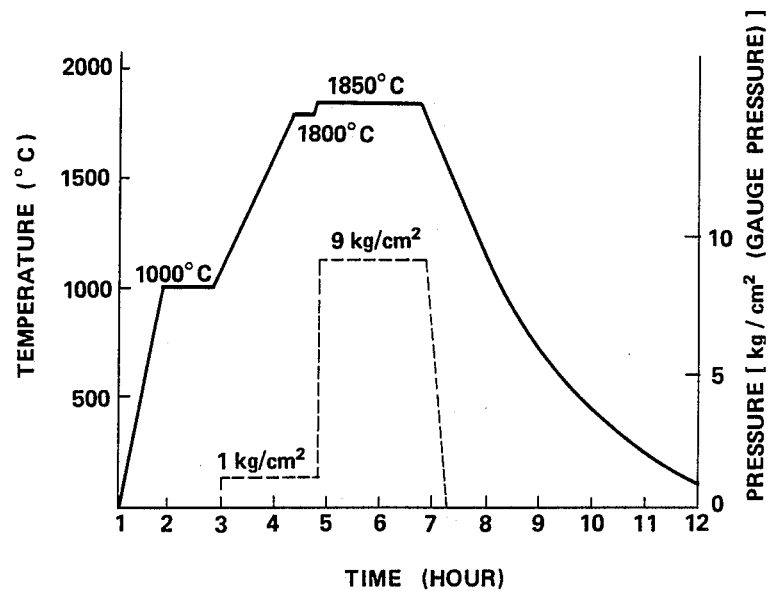
FIG. 1 is a graphic representation showing a sintering process pattern of an example according to the present invention.

A method for manufacturing a sintered body of silicon nitride comprises the steps of preparing a compact, forming a film layer, extracting and removing dispersion mediums, forming a film layer impermeable to gas and sintering.

Step of Preparing a Compact

Powdery silicon nitride and a sintering assistant are dispersed into a first dispersion medium composed mainly of substance capable of being extracted by supercritical fluid to form a first slurry and the first slurry is cast to form a compact.

Step of Forming a Film Layer

Powdery material is dispersed into a second dispersion medium composed mainly of substance capable of being extracted by means of supercritical fluid to form a second slurry and the prepared compact is coated with the second slurry to form a film layer. In this step, means for coating the second slurry can be either dipping the compact in the second slurry or brushing over the compact The film layer formed by coating is desired to be thicker with view to procure reliability of gas impermeability, but the excessive thickness is easy to cause cracking of the film layer in the step of removing the dispersion mediums after coating. The thickness of the film layer ranges preferably 0.2 to 4.0 mm. The powdery material to be dispersed into the second dispersion medium can be preferably selected from glass powder and non-oxide ceramic powder to which a sintering assistant is added As the glass powder, silica and borosilicate glass are desirable As the non-oxide ceramic powder, silicon nitride and silicon carbide are desirable The coated film layer becomes impermeable to gas through the steps of extracting and removing the dispersion mediums and of forming the film layer impermeable to gas hereinafter mentioned. The impermeable film layer can be of multilayer structure to improve its impermeablity to gas. In addition, to improve separability of the compact and the impermeable film layer, it is recommendable to form an inactive layer. The inactive layer can be any one selected from the group consisting of high melting metal powder and non-oxide ceramic powder. As the high melting metal powder, tungsten, molybdenum, tantalum and niobium, and as the non-oxide powder, boron nitride, aluminum nitride, di-boron titanium, di-boron zirconium, boron carbide, silicon nitride and silicon carbide, are desirable.

Step of Extracting and Removing the Dispersion Mediums

The compact covered with the film layer is dipped in supercritical fluid to extract and remove the first dispersion medium included in the compact and the second medium in the film layer This step features removing the dispersion mediums respectively included in the compact and the film layer through a single process by using the supercritical fluid as a solvent. The supercritical fluid used in this step is preferably selected from the group consisting of carbon dioxide, ethane, ethylene and monochlorotrifluoromethane, having their critical temperature at the vicinity of room temperature This is because there is fear of the compact being broken unless its expansion and contraction is made as small as possible. Such expansion and contraction is produced by the change of the temperature caused due to the heating it from room temperature to the supercritical temperature and the cooling it immediately after the heating.

Step of Forming an Impermeable Film Layer

The compact from which the first and second dispersion mediums have been removed is heated to form the film layer into a film layer impermeable to gas. The heating temperature in this process is one necessary to soften and densify substance forming a gas impermeable film layer. The process is preferably carried out in the vacuum atmosphere or in the nitrogen gas atmosphere having gauge pressure of 0 to 10 kg/cm$^2$. In the vacuum atmosphere, the difference of the gas pressures at the inside and outside of the gas impermeable film layer is so small that the film layer is hard to break. If the gauge pressure is over 10 kg/cm$^2$, the difference of the gas pressures becomes large enough to have the film layer broken

Step of Sintering

The step of sintering the compact can be carried out either in continuation immediately or with an interval after the step of forming an impermeable film layer.

It is, however, preferable that pressure of gas occupying pores existing inside the gas impermeable film layer is no more than the outside pressure after the gas impermeable film layer has been formed. This is because there is fear of destroying the gas impermeable film layer due to the gas bursting out of the inside unless the pressure limit is observed.

When a sintered body of silicon nitride is manufactured in compliance with the above-mentioned steps, there are no intricate steps as found in the prior art methods In addition, time for sintering is shortened, compared to the prior art methods. Furthermore, no decomposition of silicon nitride composing the sintered body occurs, and consequently, no change in quality takes place on the surface of the sintered body.

Example-1

To material powders consisting of 92 wt.% $Si_3N_4$, 6 wt.% $Y_2O_3$ and 2 wt.% $Al_2O_3$, 22 wt.% paraffin having a melting point of 42° to 44° C. and 2.5 wt% oleric acid were added to form a mixture, and the mixture was stirred and mixed at 80° C. being maintained for 3 hours to prepare a first slurry. In the meantime, a mold having a cavity of a 10×50×70 mm rectangular parallelopiped shape with an aluminum water-cooling conduit attached thereto was prepared The first slurry was given the pressure of 3 kg/cm$^2$·G and was cast in the mold with the water cooling conduit to form a compact Subsequently, being taken out of the mold, the compact was dipped into a second slurry of 35 wt.% boron nitride and 65 wt.% t-butyl alcohol. The compact, taken out of the second slurry, was left released in the air for 10 minutes. This operation of the dipping and leaving the compact in the air was repeated five times.

Following the aforementioned process, the compact was dipped in a third slurry powders consisting of a 35 wt.% powdery mixture consisting of 80 wt.% $Si_3N_4$, 14 wt.% $Y_2O_3$ and 6 wt.% $Al_2O_3$ and 65 wt.% t-butyl alcohol After being taken out of the third slurry, the compact was left released in the air for 10 minutes In this manner, a film layer of duplex film structure amounting to 1.5 mm in thickness in total was formed Then, extraction by the carbon dioxide having 100 kg/cm$^2$·G and 35° C. was applied to the compact covered with the film layer for an hour and a half, and it was ascertained that the compact thus extracted was nearly equal to the weight of the starting powdery material After the extraction was completed, the compact was put into a sintering furnace and the steps of vacuum degassing, forming an impermeable film layer and pressure sintering was applied to the compact. FIG. 1 is a graphic representation showing a sintering pattern of an example of the present invention. The vacuum degassing was carried out in the atmosphere of 1,000° C. and $10^{-3}$ Torr. The formation of the porous film layer impermeable to gas was performed by keeping the compact in the atmosphere of nitrogen gas having 1,800° C. and 1 kg/cm$^2$·G for 20 minutes. The pressure sintering was done at 1850° C. and in the atmosphere of nitrogen gas having 9 kg/cm$^2$·G for 2 hours. After cooling the compact, the impermeable film layer was taken off by sand blasting.

The sintered body thus obtained, attained 98.8% of the theoretical density. Reduction of the weight was small enough to be of 0.1%. Furthermore, no change in quality on the surface of the sintered body was found.

Example-2

To material powders consisting of 92 wt.% $Si_3N_4$, 6 wt.% $Y_2O_3$ and 2 wt.% $Al_2O_3$, 22 wt.% paraffin having a melting point of 42° to 44° C. and 2.5 wt.% were added to form a mixture, and the mixture was stirred and mixed for 3 hours while the temperature was kept at 80° C. Thus, a first slurry was formed out of the mixture. In the meantime, a mold having a cavity of 10 mm×50 mm×70 mm rectangular parallelopiped shape with an aluminum conduit for water cooling attached thereto was prepared. The pressure of 3 kg/cm$^2$·G was applied to the first slurry, and the first slurry was cast into the mold with the water conduit attached thereto Subsequently, taken out of the mold, a compact formed out of the first slurry was dipped into a second slurry of 35 wt.% powdery mixture consisting of 80 wt.% $Si_3N_4$, 14 wt% $Y_2O_3$ and 6 wt% $Al_2O_3$ and 65 wt.% t-butyl alcohol. The compact, was taken out of the second slurry, and then, it was left released in the air for 10 minutes In this manner, a film layer of duplex film structure amounting to 1.0 mm in thickness in total was formed.

And then, the compact covered with the film layer was extracted by carbon dioxide having a pressure of 100 kg/cm$^2$·G and temperature of 35° C. for an hour and a half, and it was ascertained that the compact thus extracted was nearly equal to the starting powder material in weight.

After the extraction was completed, the compact was put into a sintering furnace and vacuum degassing, formation of a gas impermeable porous film layer and pressure sintering were applied to the compact. The pattern of sintering was the same as that of Example-1 was applied. The vacuum degassing was performed in the atmosphere of 1000° C. and $10^{-3}$ Torr. The formation of the gas impermeable porous film layer was carried out by keeping the compact in the nitrogen atmosphere having a temperature of 1,800° C. and a pressure of 1 kg/cm$^2$·G for two hours. The pressure sintering was done in the nitrogen atmosphere having a temperature of 1,850° C. and a pressure of 9 kg/cm$^2$·G being kept for two hours. After cooling the compact, the compact was taken out and the film layer thereon was taken off by sand blasting.

The density of the sintered body thus obtained attained 98.8% of the theoretical density. The reduction of the weight was small enough to mark 0.1%. The removal of the gas impermeable film layer was incomplete because the sintering proceeded between the gas impermeable film layer and the sintered body inside the impermeable film layer.

What is claimed is:

1. A method for manufacturing a sintered body of silicon nitride comprising the steps of:

dispersing powdered silicon nitride and a sintering assistant into a first dispersion medium comprising a substance capable of being extracted by a supercritical fluid to form a first slurry and casting said first slurry to form a compact containing said first dispersion medium;

dispersing a powdered material into a second dispersion medium comprising a substance capable of being extracted by the supercritical fluid to form a second slurry and coating the surface of said compact with said second slurry to form a film layer of said second slurry thereon;

extracting and removing the first dispersion medium included in the compact and the second dispersion medium included in the film layer with a supercritical fluid;

heating the compact from which the first dispersion medium and the second dispersion medium have been extracted and removed to render said film layer on said compact impermeable to gas; and sintering the compact covered with the gas impermeable film layer to form said sintered body.

2. The method according to claim 1, wherein the supercritical fluid is selected from the group consisting of carbon dioxide, ethane, ethylene and monochlorotrifluoromethane.

3. The method according to claim 1, wherein the powder material dispersed into the second dispersion medium is a non-oxide ceramic powder to which glass powder and a sintering assistant are added.

4. The method according to claim 1, wherein the first dispersion medium and the second dispersion medium are selected from the group consisting of alcohol and paraffin.

5. The method according to claim 1, wherein the film layer covering the compact includes is 0.2 to 4.0 mm in thickness.

6. The method according to claim 1, wherein the film layer covering the compact is a duplex layer.

7. The method according to claim 1 further comprising the additional step of forming an inactive film layer on the surface of said cast compact.

8. The method according to claim 7, wherein the inactive film layer is selected from the group consisting of high melting metal powder, and non-oxide ceramic powder.

9. The method according to claim 1, wherein the step of heating the compact from which the first dispersion medium and the second dispersion medium have been removed includes heating the same in a vacuum atmosphere.

10. The method according to claim 1, wherein the step of heating the compact from which the first dispersion medium and the second dispersion medium have been removed includes heating the same in a nitrogen gas atmosphere having a gauge pressure of 0 to 10 kg/cm$^2$.

11. The method according to claim 1, wherein the supercritical fluid is carbon dioxide.

12. The method according to claim 1, wherein the supercritical fluid is ethane.

13. The method according to claim 1, wherein the supercritical fluid is ethylene.

14. The method according to claim 1, wherein the supercritical fluid is monochlorotrifluoromethane.

15. The method according to claim 3, wherein the non-oxide ceramic powder is silicon nitride.

16. The method according to claim 3, wherein the non-oxide ceramic powder is silicon carbide.

17. The method according to claim 1, wherein the first dispersion medium is paraffin.

18. The method according to claim 1, wherein the second dispersion medium is t-butyl alcohol.

19. The method according to claim 1, wherein the supercritical fluid is carbon dioxide, the first dispersion medium is paraffin and the second dispersion medium is t-butyl alcohol.

20. The method according to claim 1, which further comprises the step of forming an inactive layer on the surface of the compact formed by casting the first slurry, the inactive layer being selected from the group consisting of high melting metal powder, and non-oxide ceramic powder.

21. The method according to claim 20, wherein said high melting metal is selected from the group consisting of tungsten, molybdenum, tantalum and niobium and said non-oxide ceramic powder is selected from the group consisting of boron nitride, aluminum nitride, di-boron titanium, di-boron zirconium, boron carbide, silicon nitride and silicon carbide.

22. The method according to claim 19, wherein the coated compact from which the dispersion mediums had been extracted was vacuum degassed and then heated in a nitrogen atmosphere at about 1,800° C. to form said gas impermeable film layer followed by pressure sintering at a temperature of 1,850° C. in a nitrogen atmosphere.

23. The method according to claim 15, wherein the coated compact from which the dispersion mediums had been extracted was vacuum degassed and then heated in a nitrogen atmosphere at about 1,800° C. to form said gas impermeable film layer followed by pressure sintering at a temperature of 1,850° C. in a nitrogen atmosphere.

24. The method according to claim 23, wherein the supercritical fluid is carbon dioxide, the first dispersion medium is paraffin and the second dispersion medium is t-butyl alcohol.

* * * * *